Oct. 31, 1950            D. E. SUNSTEIN           2,528,020
MASK CONTROLLED FEEDBACK SYSTEM
FOR CATHODE-RAY TUBES

Filed July 24, 1945                                3 Sheets-Sheet 1

INVENTOR.
David E. Sunstein
BY
Ostrolenk and Faber
ATTORNEYS

Oct. 31, 1950

D. E. SUNSTEIN
MASK CONTROLLED FEEDBACK SYSTEM
FOR CATHODE-RAY TUBES 2,528,020

Filed July 24, 1945

INVENTOR.
David E. Sunstein
BY
Ostrolenk and Faber
ATTORNEYS

UNITED STATES PATENT OFFICE 2,528,020

MASK CONTROLLED FEEDBACK SYSTEM FOR CATHODE-RAY TUBES

David E. Sunstein, Elkins Park, Pa., assignor to Philco Corporation, a corporation of Pennsylvania Application July 24, 1945, Serial No. 606,773

18 Claims. (Cl. 315—26)

This invention relates to a novel system for obtaining an electrical signal which is related to another electrical signal by any desired mathematical curve or expression. More particularly, my invention constitutes a non-linear circuit element whose curve can be controlled at will.

Previously employed non-linear circuit elements have been primarily units in which the volt ampere curve or the transconductance curve varied from linearity due to special peculiarities of the unit in question.

In general, these characteristics have followed no particular mathematical law. Some of them have been close to square law, but none of them have been exactly in accordance with any particular mathematical law. Such non-linear devices have been used to perform a multiplicity of services in electronic and communications equipment. For example, linear detection depends upon an abrupt change in the slope of the characteristic of a diode or of a crystal detector. Similarly, square law detection depends upon the characteristic of a circuit element, which characteristic approximates a square law relationship. Likewise, modulating devices often depend upon a precise variation of one voltage with respect to another in accordance with some mathematical law.

In none of the systems employed before my invention, have these units employed been in strict accordance with the desired mathematical law. In many instances, certain variations and modifications of circuits were made so that the approximation to the law was a fair approximation. However, all of these circuits have been limited in one of several ways. One of the most serious limitations has been the fact that there are limits of voltage beyond which these approximations do not hold.

Such limits may be limits of maxima or they may be limits of minima. For example, in a linear detector, the detector functions satisfactorily as long as the voltage to be detected is high enough. But if this voltage to be detected drops below a certain minimum value, the detection will no longer approximate linear detection, but will begin to have some of the characteristics of square law detection. To cite another example of the desirability of non-linear circuit elements, I mention the sound level indicator. A sound level indicator is a device which gives a reading proportional to the logarithm of the sound level being measured, i. e., of the intensity being measured. In order to accomplish this purpose, various connections of vacuum tube amplifiers are used in such a manner that non-linear distortion in the amplifier will occur. This distortion, however, does not meet the true logarithmic characteristic, and consequently, the remaining part of the translation into the logarithmic characteristic must be accomplished within the indicating instrument itself. At times this is done by special shaping of the pole pieces in the electrical indicating instrument, but even this may not complete the logarithmic characteristic, so recourse is had to a non-linear marking of the scale of the instrument.

In none of these applications or arrangements is it possible to control at will the relationship between a pair of voltages within a circuit. The relationship which does result comes as a special characteristic of the circuit element used, and this relationship cannot be adjusted by the operator or designer of the equipment except within rather narrow limits. Furthermore, the characteristic is ordinarily subject to wide variations with variations of line voltage, temperature, and aging and replacement of tubes, etc.

It is the purpose of my invention to provide a means in which an electrical potential difference can be developed, which potential difference shall bear a mathematical relation to some other electrical potential difference. This arrangement will then be a non-linear circuit element which may be used in any electrical circuit in which non-linear circuit elements are used.

Furthermore, since any desired mathematical relationship can be obtained with my invention, it will be possible to design a wide variety of electronic equipment heretofore considered impractical or impossible because of limitations in the kind and number of non-linear devices available. For example, my invention will allow the production of a frequency doubling device which will contain practically none of the fundamental in the output, and yet will contain no filters whatsoever.

It may be used in other applications, for example as a translator of one wave shape to another. For illustration, it can translate a sawtooth wave into any desired wave having a voltage vs. time characteristic, a single cycle of which corresponds in shape to the desired wave shape drawn as an ordinary plot in rectangular coordinates, with said plot itself cooperating with the apparatus of the invention to accomplish the translation.

Likewise, my invention will find uses as a part of electrical computing machines since my invention will, in combination with other circuits, make possible the multiplication and division and integration of electrical quantities.

As another possible application of my invention, it will become possible to correct for the non-linearity in any electronic system in which amplitude distortion is present without phase distortion in the transmission path between the correction means and the seat of amplitude distortion.

In one embodiment of my invention, a spot of light on the fluorescent surface of a cathode ray tube is caused to sweep across the tube at a rate of speed determined by input voltage. In front of the screen of the cathode ray tube, there is placed a mask, one edge of which is shaped in accordance with the mathematical expression which is to be the characteristic of the device as a non-linear device.

Beyond this screen, there is placed a photoelectric cell system, the output of which is fed into an amplifier which in turn provides deflection of the spot on the cathode ray tube at right angles to the direction in which the spot is swept by the input voltage. The operation of this system is such that the spot of light on the cathode ray tube is kept in correspondence with the edge of the mask on the tube. The voltage which is causing this deflection is also used as the output voltage. Thus, the system has as an output voltage, a voltage which is related to the input voltage by the shape of the mask placed in front of the cathode ray tube. It is quite apparent that this mask can be cut to any shape desired by the experimenter or designer, and consequently, any non-linear characteristic which is desired can be obtained.

Consideration of this system shows that the system is essentially a feed-back system. If the spot of light is too high above the mask, so much light is sent into the photoelectric cell that the output of the amplifier tends to push the spot of light downward. Likewise, if the spot of light on the cathode ray screen is obscured behind the mask, the lack of output from the photoelectric cell tends to alter the deflecting voltage in such a direction that the spot of light will travel upward.

Between these two tendencies, there exists a position of equilibrium in which the spot rests substantially upon the edge of the mask. When the edge of the mask is in the center of the screen, the spot of light will be substantially bisected by the edge of the mask in the equilibrium position. If, however, the edge of the mask is low upon the screen, it becomes apparent that more deflecting voltage is needed than was needed before to keep the spot of light low on the screen along the edge of the mask. Therefore it is necessary that in a low position on the screen more of the spot be uncovered by the mask than at a higher position on the screen. Thus, if at the center of the screen, ten per cent of the spot of light is seen by the photoelectric cell in equilibrium, at a low position on the screen, perhaps eighteen per cent of the spot of light will be seen by the photoelectric cell; and at a high position on the screen, perhaps two per cent of the area of the spot of light will be seen by the photoelectric cell in equilibrium.

This feed-back system for controlling the motion of the spot of light in accordance with the position of a mechanical mask in front of the cathode ray tube is described in considerably greater detail in my Patent No. 2,455,532, issued December 7, 1948.

My present invention, then, uses the same feed-back system for the control of the position of the spot of light on the cathode ray tube in one direction or one coordinate of the coordinate system on the face of the cathode ray tube screen; but it provides a stationary mask in front of the screen, and provides further that the spot of the cathode ray tube be swept across the tube in accordance with the second coordinate of the coordinate system on the face of the cathode ray tube.

This combination of a sweeping motion of the spot in accordance with an input signal and a feed-back system for the generation of the output signal in accordance with the mask placed in front of the cathode ray tube, constitutes the essential elements of my invention.

In arranging specific embodiments of my invention, various systems of deflection of the spot on the face of the cathode ray tube may be used. For example, the input voltage may be used to cause a horizontal deflection of the spot on the cathode ray tube.

The feed-back system may be used to control the vertical deflection of the spot on the cathode ray tube. Thus, the mask which is placed in front of the cathode ray tube will have the independent voltage plotted along the horizontal axis, and will have the dependent voltage plotted along the vertical axis. The voltage generated by this system will then be in accordance with whatever curve is plotted on this mask. Other systems of coordinates could also be used, of course. For example, the independent variable or the input could be used as the vertical axis. Thus, the input voltage would cause the electron beam in the cathode ray oscillograph tube to sweep along the vertical axis, and the photocell feed-back system would be employed to keep the horizontal deflection correct in correspondence with the edge of the mask.

The mask under these circumstances would have the independent variable plotted vertically and the dependent variable plotted horizontally. Another possible type of coordinate system would be the polar coordinate system. In such a system, the input voltage may be in accordance with the angular displacement of the spot on the cathode ray tube, and the output voltage or dependent voltage may be in accordance with the radial displacement of the spot from the center of the tube.

Each of these methods of using a coordinate system has certain pecularities which make such systems particularly well adapted for a particular job. Using the system of rectangular coordinates in which the horizontal deflection is the independent variable, a situation can occur in which the return time becomes of importance, i. e., if the input signal is a signal which increases linearly with time, it will be necessary to limit this increase at some point and return it to a lower value so that the deflection does not run off the end of the cathode ray tube. This type of input can be used when it is desired to use the system for the generation of particular types of wave form.

Certain problems occur in this type of input connected with the return of the spot from a high deflection in one direction to a high deflection in the other direction. These problems make it preferable that certain extra circuits in addition to the circuits described in my previous patent application mentioned hereinbefore, be employed in the feed-back system. These circuits are essentially limiting circuits, or clamp circuits which enable the dependent deflection to remain constant during the return trace period.

When polar coordinates are used, a polar sweep may be obtained most readily when the input signal is a sinusoid of a single frequency. Thus the polar coordinate system for the plot is preferably employed with a single frequency input. This polar plot, however, makes it possible to use this device to accomplish something which has never been accomplished in the electronic art, i. e., the creation of a frequency which is just slightly different from another frequency without the introduction of other and bothersome harmonics or closely associated frequencies. For example, if a polar plot be made which is merely a circle with its center off-centered from the origin by an amount equal to the radius of the circle, then with a single frequency input, the output is a sinusoid of the same frequency. If, however, this polar plot should be rotated at a given speed about an axis perpendicular to the polar plane at the origin, it is seen that the output frequency will be either the input frequency plus the frequency of the rotation, or the input frequency minus the frequency of rotation.

In other methods of obtaining changes in frequency such as in ordinary modulation procedure, both of these two frequencies have been obtained simultaneously, and it has been exceedingly difficult to obtain the sum frequency without the difference frequency. Customarily, this has been done with the aid of a non-linear device and a filter which removes the unwanted frequency difference.

My invention, however, makes it possible to obtain such a frequency sum without the presence at any time of the frequency difference. Likewise, it is possible to obtain a frequency difference without the necessity of obtaining the frequency sum along with it.

Accordingly, the primary object of my invention is to provide a non-linear circuit element whose curve of non-linearity can be controlled at will by the designer of the equipment.

There are other objects of my invention, which together with the foregoing will appear in the detailed description to follow in connection with the drawings, in which.

Figure 1:
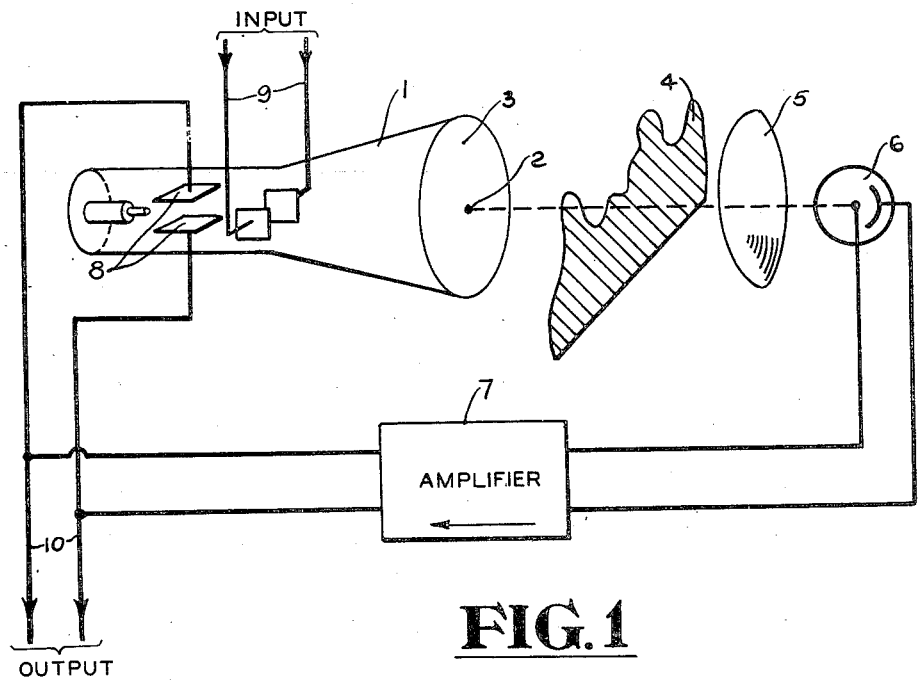
Figure 1 represents a diagram of the simplest elements of the system.

In Figure 1 the cathode ray tube 1 has a spot 2 formed on its fluorescent face 3. Light from this spot 2 passes by mask 4 through lens 5 into photocell 6. The plane of mask 4 is preferably in close proximity to the plane of the face of the cathode ray tube, or alternatively, an auxiliary lens or mirror system may be placed between the two planes in such a manner that the two planes conjugate focal planes of the system so inserted. Lens 5 serves the function of collecting as much light as possible from the spot, and bringing it to bear upon the sensitive surface of the photoelectric cell. It is primarily a sensitivity increasing device.

The output of photoelectric cell 6 is amplified in amplifier 7, and is applied to the vertical deflection plates 8 of the cathode ray tube. The input signal is brought into the tube over conductors 9 and is used to cause the horizontal deflection of the spot on the surface of the cathode ray tube. The deflecting plates 8 are initially supplied with a D. C. bias voltage, so that the cathode ray spot appears at the top of the screen when no light shines upon photocell 6. The amplifier 7 is connected to the photocell 6 and to the cathode ray tube deflecting plates with a polarity such that the spot is caused to be deflected downward as the incident light upon the photocell is increased, as will be explained more fully hereinafter.

Thus, the cathode spot will be degenerated downward until the edge of the mask 4 prevents almost all light from passing to the photocell.

In accordance with the arrangements shown, the photoelectric cell will, in this condition, preferably receive no more than half of the light from spot 2, the remainder being cut off by the edge of the mask 4, and a condition of equilibrium obtained.

If now the spot is deflected sideways to a point where the mask obstructs the light so that the light impinged on the photoelectric cell is decreased, less signal is fed into the amplifier 7. This amplifier is of such nature that when less signal is fed into it, the output voltage impressed across the deflecting plates is changed in such a manner that the spot 2 is caused to rise. The spot continues to rise until it reaches the edge of the mask and some of the light from the spot is again impinged on the photoelectric cell 6. The resulting change in the photoelectric cell response will bring this spot to a stop at a new upwardly deflected position of equilibrium produced by a voltage output of amplifier 7 which is a function of the extent of increase in the height of mask 4 corresponding to the sidewise deflection of spot 2.

If the sidewise deflection of spot 2 should have increased the light intensity thrown upon the photoelectric cell, the output of the photoelectric cell would increase correspondingly; and the amplifier output is such as to cause the spot on the cathode ray tube to move downward. As in the first example, the new deflected position of equilibrium of the spot is effected by a voltage output of the amplifier 7 which is a function of the extent of decrease in height of mask 4 corresponding to the sidewise motion of spot 2.

Accordingly as the spot 2 is moved sideways, it will follow the edge of the mask as the mask increases or decreases in height.

As will now be obvious, when the spot is in the position shown in Figure 1, the output voltage between conductors 10 will have a specific value. If now the spot moves to one side and is also pushed upward in accordance with the shape of the mask, the output voltage between these conductors 10 will have a value which will correspond to the new position of the spot 2. In order that the voltage on line 10 may be different than it was before, the input voltage to the amplifier becomes different than it was before, and consequently a correspondingly different area of the spot on the oscilloscope becomes exposed to the photoelectric cell at the new equilibrium.

Inasmuch as the amplifier has a high gain, it takes a relatively small amount of change in the output from the photoelectric cell 6 to cause a considerable change in the position of the spot 2. Accordingly, when the spot is deflected to a different than central position, the spot will, in practice, take only a slightly different relative position with respect to the mask than it had in the central position. This condition will obtain as long as the amplifier has a sufficiently high gain, and so long as the diameter of the spot is small. Thus when the mask is of less than central height, the spot is lowered correspondingly, and it becomes necessary that the voltage on line 10 be correspondingly changed.

The photoelectric cell output which is fed into the amplifier is also changed in order to change the output of the amplifier. However, the gain of the amplifier is preferably so high that a relatively small input voltage will cause the spot on the cathode ray oscilloscope to drop from the central position to the lowered position of the screen. This system is essentially an electrical optical feed-back system. The changing height of the mask corresponding with the changing horizontal deflections of the spot 2 is followed by spot 2 of the cathode ray tube screen, because the difference in position between the spot 2 and the height of mask 4 is picked up by photocell 6, fed through the amplifier 7 and back into the cathode ray tube through line 10 in order to control the position of spot 2.

Further details of the amplifier system, which is useful in accomplishing this result, are described in my Patent No. 2,455,532.

Many circuits, of course, could be drawn and constructed which would perform the function of the photocell amplifier combination shown in Figure 1. This basic system then allows the formation of an output signal on an output line 10 which bears a definite relation to the input signal on line 9. This definite relation is determined by the shape of the upper edge of the mask 4.

Figure 2:
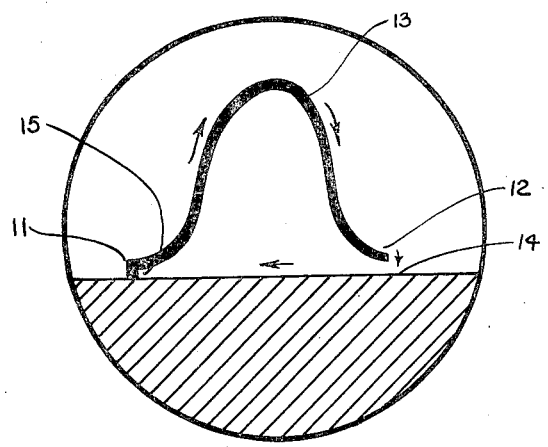
Figure 2 represents a variation of the mask part of the equipment.

With the modifications and improvements of my invention, particularly of the feed-back amplifier system shown in my Patent No. 2,455,-532, of which this is a continuation-in-part, it becomes possible to use, instead of a mask which is opaque on one side, a line which is relatively narrow. An example of such a line is shown in Figure 2 as it appears viewed from the photoelectric cell. This line may be drawn upon a transparent piece of material, such as a celluloid film or a piece of glass which is interposed between the cathode ray tube and the photocell, or it may be drawn directly upon the surface of the photocell itself, or of the cathode ray tube itself.

One possible application of my invention involves a generator of wave form of a predetermined type from an input wave of another predetermined type, as for example, a saw-toothed wave form; i. e., a wave form in which the voltage increases linearly with time from a low value to a high value and then drops suddenly to the original low value and increases again linearly with time. Such voltages are commonly used in the deflection circuits of cathode ray oscilloscopes. Using such an input voltage on line 9, the output voltage on line 10 will have the wave shape of one cycle coinciding in shape with the curve. Thus, the output voltage would become a periodic function, one period of which appears to be that shown in the mask.

Such a mask is indicated in Figure 2. The spot on the cathode ray tube in this figure, starts at position 11, travels upward and to the right along the curve, and ends at position 12 on the mask.

When position 12 is reached, several possibilities can occur. One possibility is that during the return trace (when the horizontal deflection of the spot moves very quickly from position 12 to position 11), the spot retraces the curve shown on the graph. The output voltage curve then would be a curve similar to the one shown in Figure 2 by the graph followed by a very short vertical rise and fall in output voltage.

Such a very short peak of output voltage may be undesirable under certain circumstances, and consequently, a system for returning the spot from position 12 to position 11 without the necessity of retracing the basic curve on the screen on the mask is desired. Figure 2 shows how this can be done by one method.

In reaching point 12, the spot goes just beyond the end of the basic curve 13. The action of the amplifier is immediate, and causes the spot to drop to the level of the lower mask 14 on the screen. Simultaneously, the return trace occurs, and the spot 2 on the cathode ray tube travels to the left along the surface of the line 14 until the corner 15 is reached. When the corner 15 is reached the spot quickly rises to the upper surface of curve 13, and is ready substantially at position 11 to repeat the trace over curve 13.

This passage from point 12 to 14 to 15 to 11 takes only a very very short time, and consequently, although there will be a slight variation in the output voltage at this interval of time, it will not be a substantial variation from the curve itself.

Figure 3:
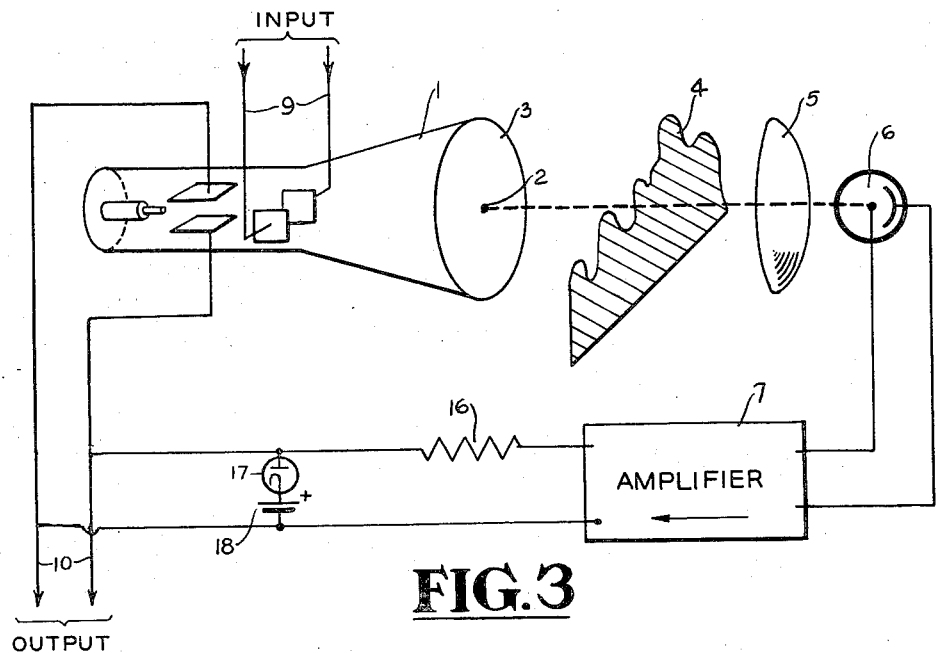
Figure 3 shows a modification of the basic system.

An electrical method of providing this clamp during the return trace period is shown in Figure 3. Here the output of the amplifier is equipped with a resistor 16 and a diode 17 and a battery 18. In the operation of this circuit, the mask does not have a lower opaque section 14. However, when the spot falls off the end 12 of the curve 13, the voltage in the photoelectric cell becomes a maximum; i. e., full brilliance is exposed to the photoelectric cell and as a result, the full output of the amplifier is obtained. This output, however, is limited by the diode 17 and the battery 18. The battery voltage biases the diode to prevent current flow until the output voltage of the amplifier rises to a predetermined level. When this occurs, the diode becomes operative and prevents the voltage being fed back to the vertical deflection plates from extending substantially beyond the voltage of battery 18.

Thus the spot on the cathode ray tube is allowed to drop to a predetermined level corresponding approximately to the surface level of the mask 14 but when it reaches that level, the diode holds the voltage at that position, and prevents it from dropping any further. Thus there is no loss of sensitivity or gain of the amplifier during the active section of the curve, but when the spot does fall off the end of the curve at the end of the sweep and is engaged in the return sweep, the spot on the cathode ray tube is not allowed to fall to too low a level, but is held at substantially the same level that it had at point 12 on the curve 13.

Figure 4:
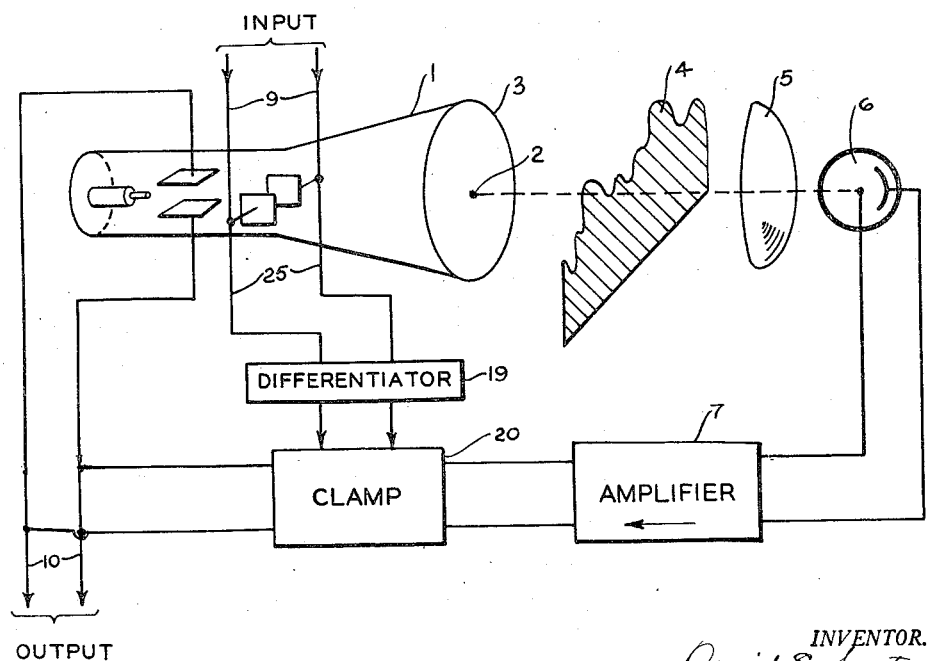
Figure 4 shows another modification of the basic system.

A further circuit for accomplishing this result is shown in Figure 4. Here the output of the amplifier is passed through a clamp 20 which is controlled from the input sweep signal coming in on line 9 through the differentiator 19. The method of operation of this system is as follows:

The input signal on line 9 sweeps the spot from left to right upon the surface of the oscilloscope screen; the differentiator differentiates this sweep, and a small signal results which prevents the clamps from operating. However, when the input sweep signal sweeps the spot from right to left at a rapid rate, the differentiator has an output signal of substantial magnitude and of opposite polarity to that occurring when the spot is swept from left to right. This signal then renders the clamp operative and sets the output of amplifier 7 at a value determined by the clamp itself. Thus amplifier 17 has no control upon the vertical deflection during the time of the return trace. This method of taking precautions against voltage peaks during the return trace holds the voltage output at some predetermined constant level during the return trace, and then returns control to the amplifier 17 and the mask 4 or 13 during the forward motion of the sweep.

Figure 5:
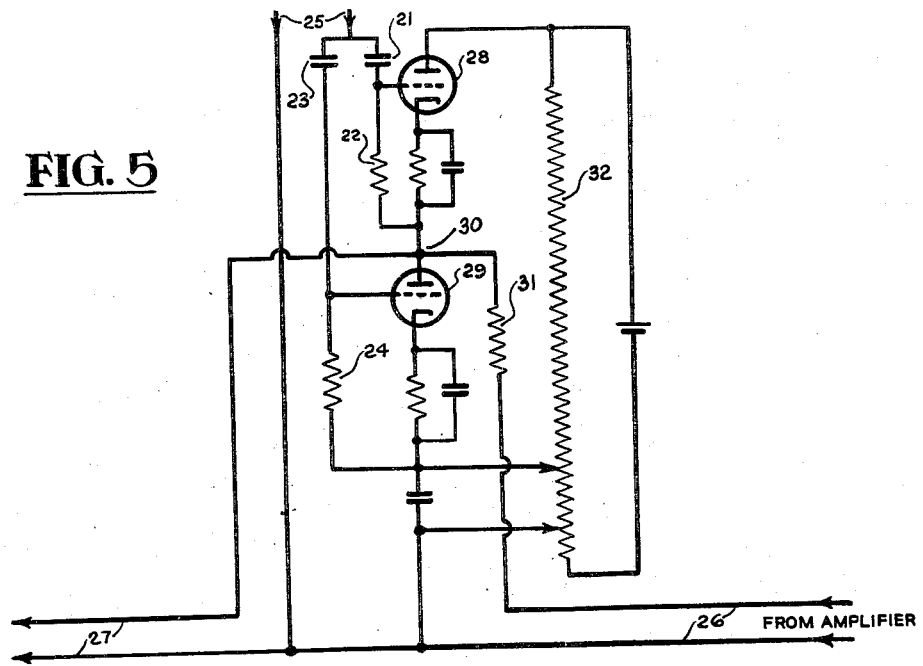
Figure 5 shows the clamp circuit shown in Figure 4.

A specific design of the differentiator and clamp is shown in Figure 5. The differentiator system consists of capacitor 21 and resistor 22 for one tube, and capacitor 23 and resistor 24 for another tube. The input signal from the input circuit impressed over line 25 is differentiated by these two circuits. The input signal from the output of the amplifier flows over line 26, and the output signal to the vertical deflection system is taken from line 27.

During the time that the grids of tubes 28 and 29 are sufficiently negative with respect to the cathodes of these tubes, these tubes are cut off and the circuit from point 30 appears, so far as the tubes are concerned, to be open.

Thus the output from the amplifier fed over line 26 through resistor 31 is directly fed to the output line 27 without any interference from tubes 28 and 29. However, when the input signal is changing in such a direction that there is a positive potential produced on the grids of tubes 28 and 29, these tubes act as a voltage divider across part of the resistor 32, and thus set the level of the point 30 as a definite voltage above ground. Resistor 31 is sufficiently large so that under these circumstances the amplifier loses control of the output over line 27 and control is obtained by tubes 28 and 29 at a fixed voltage above ground. This occurs only when the input to the differentiating circuit is of the right polarity and is changing in the right direction so that positive voltages appear on the grids of tubes 28 and 29. This condition is obtained during the time that the return trace is moving the spot rapidly from the right-hand side of the tube face to the left-hand side of the tube face. Thus, during the return trace time, this system will hold the potential of the vertical deflection plates, and therefore the vertical deflection position of the spot at a value fixed by the setting of the taps on resistor 32; but will release it to be controlled by the mask during the forward trace time which constitutes, of course, most of the cycle.

Figure 6:
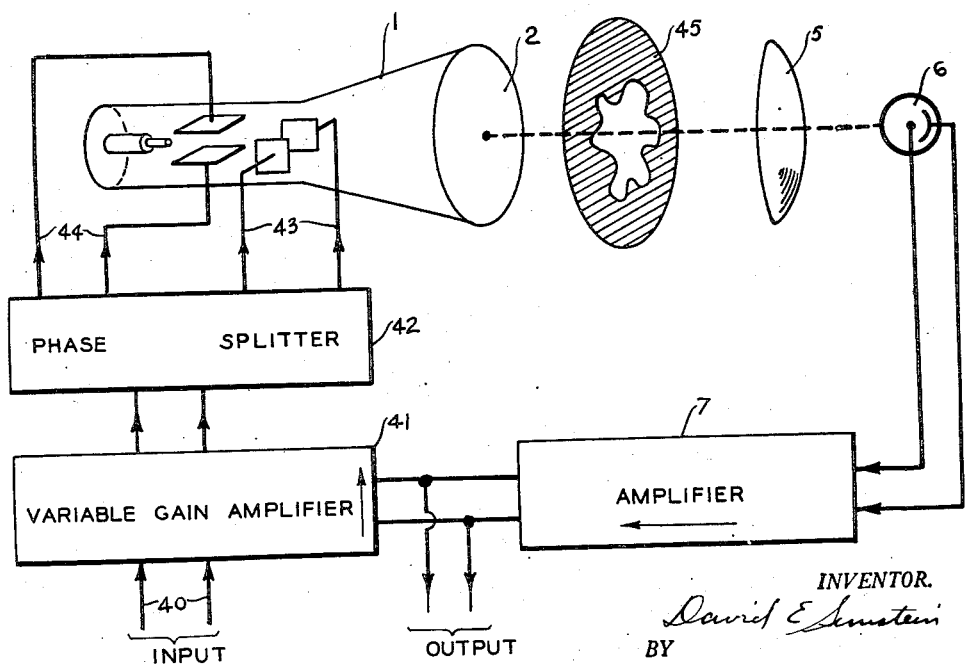
Figure 6 shows a modification of the basic system for use with polar coordinates.

A system for using polar coordinate deflection in the invention is shown in Figure 6. Here, an input signal on lines 40 passes through a variable gain amplifier 41 through a phase splitter 42 and out of the phase splitter onto the two sets of deflection plates. The phase splitter is so arranged that the voltages on line 43 are 90° out of phase with respect to the voltages on lines 44 and are of equal magnitude. Thus the cathode ray is caused to travel in a circle whose radius is determined by the gain of amplifier 41.

In this embodiment of the invention, the mask 45 is designed as a polar coordinate mask. The spot is so arranged that it rests on the inner edge of the mask in the diagram as shown, and the light from the spot falls upon the photoelectric cell feeding the amplifier 7, and the output of this amplifier 7 is fed into the amplifier 41 and is used in this amplifier to control the gain of the amplifier. Thus, when too much light falls upon the photoelectric cell, as would occur if the spot were too near the center of the mask, the output of amplifier 7 is used to increase the gain of amplifier 41. This increase in gain pushes the spot on the cathode ray tube further to the outer edge, i. e., it increases its radial deflection and brings the spot into correspondence with the inner edge of mask 45. Likewise, if too little light falls upon the photocell, showing that the spot is too far out and is hidden by mask 45, the output of amplifier 7 decreases, and causes the gain of the variable gain amplifier 41 to decrease. This action brings the spot closer to the center of mask 45 and causes a corrective action, thus bringing the spot to the edge of the mask 45.

This system is preferably employed with a substantially sinusoidal input, because a simple phase splitter will work only for a given frequency, i. e., it will give the 90° phase shift only for specified frequencies, and will not give this phase shift for other frequencies.

It will now be apparent that there are numerous applications of the system shown in Figures 1 through 5. Starting with a saw-toothed wave, wave forms of almost any predetermined shape can be generated in one single step using the method of Figure 4. This often is a considerable saving in equipment, since at times a great number of tubes is required to form a given type of output signal from a simple saw-toothed signal.

There are many applications and modifications of the circuit of Figure 1 as a non-linear circuit element.

Thus, it may be employed to generate electric waves of arbitrary wave form by following a geometric construction of the desired wave form with high precision. Indeed, the device is adaptable for analyzing the spectrum of any wave form of arbitrary shape. It may be used as an integrator which will measure the average value of an arbitrary wave form; and as a device for producing a series of output waves in synchronism with individual incoming waves, each output wave having the abritrary form of a wave-shaped pattern drawn on a chart. This device will permit the generation of waves of a desired musical "quality" of the frequency of the incoming wave.

It will be clear from the description given that the invention lends itself to permitting secret transmission of speech sounds.

By the use of a mask shaped according to a logarithmic curve, a voltage equal to the product or quotient of the amplitude of two or more voltages may be provided. The voltages are added to produce multiplication, and subtracted to produce division. Push-pull operation is utilized if either of the voltages has a negative component.

An alternative device using my invention for the same purpose squares the sum of the two voltages and subtracts from the result the square of the difference. In this case the squaring operation is performed by a device having a parabolic mask. The same principle may be used to provide division if the reciprocal of the input voltage is provided by the use of a hyperbolic mask.

Such a device will find useful applications in watt-meters, single side band modulators, frequency adding devices, and electronic equation solving apparatus.

By using a mask of a parabolic type the output wave will be a pure second harmonic of the input wave. The frequency may thus be multiplied by a factor of two without the introduction of undesired harmonics. The frequency may be multiplied by a factor of three by a similar apparatus.

If a mask providing a square root is used, frequency division by a factor of two is available.

Thus, by using a number of the devices of this invention the frequency may be multiplied and divided by any factor to obtain signals which are not harmonically related to the input sine wave signal but are nevertheless synchronously related thereto.

Because this invention permits an output wave to be generated which is related in an arbitrary manner to the input wave, it may be used to compensate for non-linearity of a transmission system. The output of the transmission system is compared with the input, and the invention then inserted in a portion of the transmission system, and the mask is modified until comparison shows that there is no over-all non-linearity.

The device of this invention may be used as an instantaneous controller of an alternating current generator to permit the generation of any desired wave form and any predetermined output voltage regardless of the nature of the load which may be associated with the generator.

It also makes possible a phonograph involving no moving parts. The recording signal may be an opaque spiral trace on a transparent disc. The light beam from the spot on the cathode ray screen will follow the edge of the recorded line and the output will correspond to the recorded sound. The angular motion of the beam was provided by the usual application of dephased signal to the two sets of deflecting plates.

The invention also provides the necessary element to permit the construction of an electronic Fourier analyzer. In this system for performing a harmonic analysis, the wave to be analyzed is used as a mask in Figure 1. One set of deflecting plates is fed from a saw-toothed input. Thus the horizontal deflection of the beam on the cathode ray tube is caused to follow a saw-toothed path; i. e., it moves slowly from left to right, returns very rapidly to the left, and repeats its slow but uniform motion from left to right.

By this procedure the wave shape of the signal output is the same as the shape of the mask which has been used in the photo-former. Thus the photo-former translates the mathematical shape on the mask into an electrical variation of signal. This electrical variation of signal then contains all of the harmonics that are present in the wave shape of the mask. This electrical output signal is analyzed by any suitable wave analyzer.

By the use of a number of embodiments of my invention an electronic device for solving algebraic equations and simultaneous equations may be constructed. The capabilities of the device would only be limited by the complexities of the equipment.

To achieve this, a source of sweep signal, the instantaneous value of which represents the unknown in the equation, is applied to each of a multiplicity of non-linear devices as illustrated in Figure 1. Each of these non-linear devices represents one of the functions in the equation to be solved. For example, the mask used would have the shape of the function $f_1$ in the equation to be solved. Thus the device converts the sweep signal into the function $f_1(x)$.

The outputs of these non-linear devices are added up by a suitable voltage adder, and the output of the voltage adder is used to vertically deflect an auxiliary cathode ray tube. The cathode ray tube is horizontally deflected by the same sweep signal as was used to supply the non-linear devices. It is apparent that if the equation is expressed $$f_1(x)+f_2(x)+f_3(x)\ldots+f_n(x)=0=Z$$

the cathode ray tube will give a plot of Z as a function of $x$. When Z is equal to zero, the equation is satisfied. Therefore, by looking for the zero intercepts of the wave form appearing on the screen of the cathode ray tube, the real values of $x$ which satisfy the equation can be directly read off from a calibrated scale on the face of the auxiliary cathode ray tube.

Another application of my non-linear device is to a speech-scrambler system. This system provides a simple scrambling method not readily capable of being unscrambled by unwanted listeners.

The scrambling device essentially consists of a means of mixing with an incoming speech wave one or more other wave forms through a non-linear device which has a predetermined characteristic. The unscrambler comprises a means of feeding the scrambled speech through a non-linear device having a conjugate characteristic to that of the non-linear device employed in the scrambler, and a means of removing the unwanted waves still remaining after passing through said non-linear device.

Thus, for example, a speech signal is added to three sine waves at 1000 c. p. s., 400 c. p. s. and 100 c. p. s. respectively. The sum of the two sets of signals is fed to a suitable non-linear device, such as I have described in Figures 1 to 4, and the output from this non-linear device will obviously contain a multitude of cross-product frequencies which may be made of sufficient amplitude to render the resulting wave unintelligible when listened to directly. The output of this scrambler may then feed any transmission system (such as radio or wire links) the output of which feeds into an unscrambler.

A system similar to the speech scrambler may be used to reduce the band width of messages including words and other discontinuous information. A similar device would then be used at the receiver to reconstitute the message in its original form. To achieve this the higher frequencies are reduced towards the average frequency, and the lower frequencies are increased towards the average frequency, so that only a narrow band in the region of the average frequency need be transmitted.

My invention will also serve to produce a wave whose instantaneous amplitude is the square root of the amplitude of the input sine wave regardless of frequency. A device so constructed will provide the necessary element of a phase shifter which will give a 90° phase shift over a wide frequency range.

By the use of my invention it is possible to provide a device which produces an electric wave which is the derivative of the voltage of one input wave with respect to the voltage of another input wave. This is accomplished by differentiating each of the input waves with respect to time and applying the differentiated results to a device according to my invention, the output of which is the algebraic ratio of the two inputs. This device is useful in the solution of differential equations.

For example, input signal X entering the differentiator provides an output signal which is $$\frac{dx}{dt}.$$

Likewise, the input signal Y entering the differentiator provides an output signal which is $$\frac{dy}{dt}.$$

When these two signals $$\frac{dx}{dt}$$

and $$\frac{dy}{dt}$$

are put into the algebraic voltage ratio device, this device takes their ratio. As a result of this division, the term $dt$ cancels out and all that remains is $$\frac{dy}{dx},$$

as shown by the following equation:

$$\frac{\frac{dy}{dt}}{\frac{dx}{dt}} = \frac{dy}{dx}.$$

This is the derivative which was originally desired and it is this form of differentiation which is independent of time, and can be exceedingly useful in the solution of differential equations by an electronic equation solver.

In some applications, particularly for example, in the reproduction of laterally magnetically recorded signals from a wire, it is desirable to be able to produce waves which, in amplitude, correspond to the sine or cosine of the voltage of the wave applied thereto. Two embodiments of my present invention provided with masks having the shape of sine waves of several cycles may be utilized to perform this service. In each case the rest position of the beam is at the appropriate point on the sine wave to generate a pure sine or a pure cosine.

This invention is also usable but not to the exclusion of other more or less satisfactory substitutes, in other apparatus which I have invented, for example, the following:

A tone generator for electrical musical instruments may use my invention, particularly as it is readily adaptable to having the quality of the tone changed by changing the shape of the mask. This may be done by substituting different masks or by making the mask flexible, its shape being under the control of a musician.

The 90° phase shifter described above may be used in a device providing single side band modulation without the use of filters.

The device may be used for square law rectification and particularly for the detection of single side band signals. It is particularly useful because the square law curve may be provided in the mask and the system will not be critical to supply voltages or variations of tube characteristics.

A volume compressor or volume limiter may be provided by the use of a logarithmic mask. This would permit the automatic monitoring of transmissions and recordings. The conjugate curve would be used before the signals were reproduced to restore the original character of the signal.

A device of my invention may have applied to the two sets of deflecting plates, a locally generated signal and a second signal harmonically related thereto. The mask may be adapted to have the shape of the resulting pattern on the screen when the phase relation is correct. Any departure from correct phase will result in rotation of the figure. Such rotation will generate a signal which may be used to modify one of the input signals so as to bring the phases into correct relation.

Another use which can be made of my invention takes the form of an amplitude modulation detector. This detector removes the distortion resulting from change of phase or magnitude of side bands through fading or other causes. Theoretically, it can produce distortion-free reception in spite of selective fading. It works equally well on single side band or on double side band transmission.

The detector comprises a means of producing the modulation component of the incoming signal with any distortion that may appear, and also a means of producing another modulation component derived from the incoming signal with the distortion terms accompanying said latter modulation signal of opposite phase to the distortion terms contained with the first modulation signal, and a means of adding the two modulation signals with their distortion terms in such a manner that the distortion terms are cancelled.

In one example of a sysem for accomplishing this, a modulated signal containing a carrier and one or two side-bands is supplied to a voltage algebraic squarer. It is also supplied to a carrier modifying network which either shifts the phase of the carrier by an angle preferably 180°, or alters the amplitude of the carrier to either a very small or large value, or provides a combination of amplitude and phase change of the carrier alone, and which leaves the side-bands unaltered in phase and amplitude. The output of the carrier modifier is supplied to an additional voltage algebraic squarer, and the output of this voltage algebraic squarer is subtracted from the output of the first-mentioned voltage algebraic squarer by a voltage subtractor to produce a signal which contains the desired modulation components contained on the original incoming signal applied, plus only high order terms which may be harmonics of the carrier and its side-bands, and which are filtered off by an audio frequency filter to supply a signal containing no distortion and no spurious responses.

The device of my invention may be used to correct distortion by providing a mask which will produce a pure sine wave result from a distorted sine wave input. The device will be independent of frequency.

It is not necessary to pass the whole useful signal through the device of this invention as it may be used as part of the feedback network around an amplifier so that only a small portion of the energy need be handled by the device of this invention.

In order to be specific, the above variations and uses of my invention were described in terms of a mask which was presumably to be applied externally of the cathode ray tube. This construction is preferable when it is desired to handle the mask. If the mask can be of more or less permanent construction, it may be made of conducting material and placed inside the cathode ray tube. With such a construction no light need be generated, the cathode ray beam itself serving to complete the circuit to the amplifier. Such a construction has the advantage that it is insensitive to external light, is simpler and of greater sensitivity. It has the disadvantage of much less flexibility.

The structure herein illustrated may be modified to improve the operation in many respects. Thus, means may be provided for maintaining constant the brightness of the cathode ray spot regardless of the speed of its motion.

Provision may be made for restoring the spot to the edge of the mask if it happens to fall to the bottom of the screen.

The mask may be built into the cathode ray tube, and a conducting target may be used, thus eliminating the photoelectric cell. While such a construction would reduce the facility with which the mask might be modified or changed, it has a substantial advantage in the reduction of the amount of amplification required in the feedback system; in fact, in some cases, no amplification is required.

The spot may be caused to return to its starting point along a straight line, instead of retracing the edge of the mask, for various technical reasons.

A lens may be used to concentrate light, passing the mask, on the photocell, regardless of whether or not a lens is used between the screen and the mask. The photocell and the amplifier may be combined in a single envelope.

The amplifier need not be capable of D. C. amplification, but need only amplify the range of A. C. frequencies encountered in operation. In this case, the bias on the vertical deflecting plates should be adjusted to center the beam on the center of the area bounded by the mask and the return line, but the mask may be adjusted to this position if more convenient.

Various other details of the construction of my preferred system may be modified as the use may require, as for example, as follows:

Optical means such as refractors, reflectors and the like, may be used to increase the effectiveness with which the light from the spot is collected and transmitted to the photocell.

A limiter may be provided to prevent the spot from falling below the bottom margin of the mask, but if a triangular wave shape is used for deflection, the spot need never pass beyond the edge of the mask.

The automatic saw-tooth signal synchronizer on which Millard E. Ames and I filed application Serial No. 551,948, on August 30, 1944, now Patent No. 2,448,069, issued August 31, 1948, may be used if it is desired to change the wave shape of an incoming signal to a new shape having the same period, and the circuit of my application Serial No. 551,949, filed August 30, 1944, now Patent No. 2,448,070, issued August 31, 1948, is also applicable. By arranging an automatic volume control to keep the average amplitude of the output wave equal to the average amplitude of the input wave, the change of wave shape will be the only change which affects a wave passing through the system.

From such a combination of elements can be developed a true watt meter for high frequency circuits; as can also be, single side band modulators, frequency adding devices, electronic equations solving apparatus, and a host of other types of electronic equipment which have never been available up to the present.

The operations herein described are made possible in carrying out my invention by having available a light source, the position of which can be moved readily by the application of a voltage. Such a device is the cathode ray tube, and consequently, the cathode ray tube is a practical embodiment of my invention. It, in combination with the photocell and the amplifier, and the opaque mask with the shaped edge, in the circuit that I have described above, constitutes the main theme of my invention. However, since my invention can be arranged in a great many ways, I prefer to have my invention not bounded by the description given above, but to be described and bounded by the following claims.

I claim:

1. In a system for generating electric signals, a source of light, a light-responsive device having an output circuit, means comprising two pairs of deflecting members for independently deflecting said source of light in the two coordinates of a plane coordinate system, a mask shaped on one edge in accordance with a desired mathematical function, means for applying an input signal to one of said pair of deflecting members for sweeping the light from said source across said mask, light from said source being impinged on said light-responsive device under the control of said shaped edge of said mask as said light is swept across said mask, means including the other of said pair of deflecting members for bringing the light at each instant from said source impinged on said light-responsive device into a state of equilibrium in accordance with the shaped edge of said mask, said last mentioned means producing output signals related to the input signal by the shape of the mask.

2. In a system for generating electric signals, a cathode ray tube capable of emitting a cathode ray beam, a mask shaped in accordance with a desired mathematical relationship, said mask being in the path of said cathode ray beam, said cathode ray tube having first deflecting means for deflecting said cathode ray beam in a first sense in accordance with an input signal said cathode ray tube having second deflecting means for causing said cathode ray beam to be deflected in a second sense, a source of signal energy applied to said second deflecting means and controlled by said mask for maintaining said beam on one edge of said mask as said beam is moved in said first sense, and means for producing output signals in accordance with the deflection of said cathode ray beam in the second sense.

3. In a system for generating electric signals, a cathode ray tube capable of emitting a cathode ray beam, a first and second deflecting means for deflecting said beam in two coordinates, means for applying signals to said first deflecting means to deflect said beam in one coordinate at a fixed predetermined rate, a fluorescent screen in said cathode ray tube, a light-responsive device exposed to light from said screen, a mask having an edge of a predetermined shape between said light-responsive deviec and said screen, an amplifier connected to said light-responsive device, circuit connections from the output of said amplifier to said second deflecting means for controlling the extent of deflections of the cathode ray in a second coordinate to the edge of said mask in accordance with light impinged on said light-responsive device, and means including said circuit connections for producing an output signal which is related to said input signal by said shaped mask.

4. In a system for generating electric signals, a cathode ray tube containing means for emitting and forming a cathode ray beam, means for deflecting said beam in accordance with a circular path at an angular velocity proportional to the frequency of an input signal, a fluorescent screen, a light-responsive device, a mask with a formed edge interposed between the fluorescent screen and the light-sensitive device, an amplifier means for controlling the radial deflection of said cathode ray beam, and means for obtaining signals dependent upon this deflection.

5. In a system for generating an electric signal, a cathode ray tube capable of emitting a cathode ray beam, first deflecting means for deflecting said beam in one coordinate in accordance with an input signal, fixed with respect to the cathode ray tube a mask in the path of said beam and having an edge shaped to conform to a desired mathematical relationship, second deflecting means for deflecting said cathode ray zeam in a second coordinate, a source of signal energy controlled by said mask in such a manner that said cathode ray beam as it is moved in said one coordinate remains in equilibrium controlled by said edge of said mask, and means for producing a signal dependent upon input signals and the deflection of said cathode ray beam in said second coordinate.

6. In a system for generating an electric signal, a cathode ray tube capable of emitting a cathode ray beam, a mask shaped in accordance with a desired mathematical relationship in the path of said beam, first deflecting means for deflecting said cathode ray beam in one coordinate in accordance with an input signal, second deflecting means for deflectingg said cathode ray beam in a second coordinate to track with one edge of said mask as said beam is moved in one coordinate, and signalling means controlled by said mask for producing a signal in accordance with the deflection of said cathode ray beam in a second coordinate.

7. In a system for generating electric signals, a cathode ray tube capable of emitting a cathode ray beam, means for independently deflecting said cathode ray beam in each coordinate of a two-coordinate system, means for controlling the deflection of said cathode ray beam in one coordinate of said coordinate system in accordance with an input signal, a mask with one edge shaped in accordance with a mathematical relationship in the path of said beam, signalling means controlled by said mask for controlling the deflection of said cathode ray beam in the second coordinate of said coordinate system so that said cathode of ray beam rests in equilibrium at a deflection determined by said shaped edge of said mask as the beam is moved in said one coordinate, and means for obtaining signals dependent upon said deflection in said second coordinate.

8. In a system for generating an electric signal, a cathode ray tube within which can be generated a cathode ray beam, means for deflecting said beam in accordance with a coordinate system of two independent variables, a fluorescent screen in said cathode ray tube, a light-responsive device exposed to light from said fluorescent screen, an opaque mask between the screen of said cathode ray tube and said light-responsive device, said mask being shaped on one edge in accordance with a desired mathematical relationship expressed in said coordinate system, said cathode ray tube having a first deflecting means for controlling the deflection of said cathode ray beam in the first coordinate of said coordinate system, said tube having a second deflecting means controlled by said light-responsive device for deflecting said beam in the second coordinate for causing said cathode ray beam to remain in stable equilibrium determined by said shaped edge of said mask as said beam is deflected in the first coordinate, and means for providing an output signal dependent upon the deflection of the cathode ray beam in the direction of the second coordinate of said coordinate system.

9. In a system for producing an electrical signal, a source of light, a light-responsive device, an optical transmission path for light from said source to said light-responsive device including a member having a shaped edge, said member being fixed with respect to said source of light, means for moving said light source in one coordinate in accordance wtih an electrical input signal, means including circuit connections for controlling said light source in a second coordinate in accordance with said shaped edge as said light is moved in said one coordinate, and means for translating the position of said light source in said coordinate into an electrical signal which is a function of the input signal and member.

10. In a system for producing an electrical signal, a source of light, a light-responsive device, an optical transmission path for light from said source to said light-responsive device including a member having a shaped edge, means for moving said light source in one coordinate in accordance with an electrical input signal, means including circuit connections for controlling said light source in a second coordinate in accordance with said shaped edge as said light is moved in said one coordinate, means for limiting the excursion of said light source in said second coordinate, and means for translating the position of said light source in said second coordinate into an electrical signal, which is a function of the input signal and member.

11. In a system for generating an electric signal, a cathode ray tube within which can be generated a cathode ray beam, means for deflecting said beam in accordance with a coordinate system of two variables, means, including a fixed mask, operable as said beam is deflected in one coordinate for causing said deflection in the other of said coordinates to be a prescribed mathematical function of the deflection in the one of said coordinates, and means for obtaining an output signal in accordance with one of said deflections.

12. In a system for generating electric signals, a cathode ray tube within which can be generated a cathode ray beam, means for deflecting said beam in accordance with a coordinate system of two independent variables, and means, including a fixed mask, operable as said beam is deflected in one coordinate for causing said deflection in the other of said coordinates to be a prescribed mathematical function of the deflection in the one of said coordinates.

13. In an electrical system, a source of particles having a compound direction of motion, means for moving said particles in one coordinate in accordance with a predetermined signal, a mask having a predetermined shape, means including said mask for controlling the movement of said particles in another coordinate and an output circuit in which electrical signals are generated in accordance with the compound movements of said particles, to produce signals mathematically related to the predetermined signal by a relationship determined by said mask.

14. In a system for generating electric signals, a cathode ray tube having a fluorescent surface, an input voltage source, means for causing a cathode beam to sweep across said fluorescent surface at a rate determined by said input voltage, a mask, one edge of which is shaped in accordance with a mathematical expression, said mask being adjacent said fluorescent surface, and deflecting means variably operated under control of said mask as said beam is swept across said fluorescent surface for keeping said cathode beam in correspondence with the edge of said mask and for generating a voltage related to the input voltage by the shape of said edge of said mask.

15. In a system for generating electric signals, a cathode ray tube having a fluorescent surface, an input voltage source, means for causing a cathode beam to sweep across said fluorescent surface at a rate determined by said input voltage, a mask, one edge of which is shaped in accordance with a mathematical expression, said mask being adjacent said fluorescent surface, and means whereby said cathode beam is kept in correspondence with the edge of said mask and for generating a voltage related to the input voltage by the shape of said edge of said mask, said last mentioned means comprising a light sensitive device adjacent said mask and circuit connections from said light sensitive device to said cathode ray tube.

16. In a system for generating electric signals, a cathode ray tube having a fluorescent surface, an input signal to said cathode ray tube, means for generating a spot of light on said fluorescent surface having a sweeping motion in accordance with said input signal, a mask having a predetermined geometric construction, said mask being mounted adjacent said fluorescent surface and connected to a feedback system for generating output signals in accordance with the geometric construction of said mask.

17. In an electrical system; means for generating a beam of electrified particles; a first deflection means; a second deflection means; means for applying signals to both said means simultaneously to deflect said beam in a first and second coordinate in accordance with a preselected scanning pattern; means responsive to deviations of said beam in one of said coordinates from substantially any portion of said pattern for developing control signals; and means for applying said control signals to at least one of said deflecting means to oppose said deviations.

18. In a cathode ray system; means for producing a cathode ray beam; means for deflecting said beam in one coordinate in accordance with an applied signal; means for positioning said beam in a second coordinate in accordance with a second applied signal; and means including a mask and a feedback circuit for so altering the position of said beam in said second coordinate that said beam is maintained upon an edge of said mask as said beam is moved in the one coordinate.

DAVID E. SUNSTEIN.

REFERENCES CITED

The following references are of record in the file of this patent:

UNITED STATES PATENTS

| Number | Name | Date |
|---|---|---|
| 1,882,849 | Marrison | Oct. 18, 1932 |
| 1,976,298 | Richter | Oct. 9, 1934 |
| 2,096,985 | Von Ardenne | Oct. 26, 1937 |
| 2,144,337 | Koch | Jan. 17, 1939 |
| 2,224,677 | Hanscom | Dec. 10, 1940 |
| 2,243,600 | Hulst, Jr. | May 27, 1941 |
| 2,357,922 | Ziebolz et al. | Sept. 12, 1944 |
| 2,404,106 | Snyder | July 16, 1946 |
| 2,446,945 | Morton | Aug. 10, 1948 |
| 2,462,263 | Haynes | Feb. 22, 1949 |

FOREIGN PATENTS

| Number | Country | Date |
|---|---|---|
| 328,680 | Great Britain | May 5, 1930 |